United States Patent [19]

Krieger et al.

[11] Patent Number: 4,666,050
[45] Date of Patent: May 19, 1987

[54] MANIPULATOR FOR A NUCLEAR REACTOR

[75] Inventors: Friedrich Krieger, Würzburg; Otto Weis, Oberpleichfeld, both of Fed. Rep. of Germany

[73] Assignee: Gg. Noell GmbH, Würzburg, Fed. Rep. of Germany

[21] Appl. No.: 385,098

[22] Filed: Jun. 4, 1982

[30] Foreign Application Priority Data

Oct. 27, 1981 [DE] Fed. Rep. of Germany ....... 3142500

[51] Int. Cl.⁴ .............................................. B66C 11/10
[52] U.S. Cl. .................................. 212/211; 212/213; 212/224; 376/260
[58] Field of Search ............... 376/260, 261, 262, 263, 376/264; 212/205–221, 224, 226; 414/8, 591, 744 A

[56] References Cited

U.S. PATENT DOCUMENTS

| | | | |
|---|---|---|---|
| 14,838 | 5/1856 | Green et al. | 212/226 |
| 3,105,596 | 10/1963 | Gagnon et al. | 212/213 |
| 3,200,043 | 8/1965 | Franco et al. | 376/272 |
| 3,771,666 | 11/1973 | Fournier | 414/591 |
| 3,884,363 | 5/1975 | Ajlouny | 414/751 |
| 4,288,290 | 9/1981 | Saima et al. | 376/260 |
| 4,316,528 | 2/1982 | Dechantsreiter | 212/213 |

FOREIGN PATENT DOCUMENTS 884298 12/1961 United Kingdom ................ 376/264

Primary Examiner—Galen Barefoot
Assistant Examiner—Stephen P. Avila
Attorney, Agent, or Firm—Horst M. Kasper

[57] ABSTRACT

A manipulator for a nuclear reactor is disposed about the upper region of the reactor case. A horizontal guide rail is supported by a slewing track ring mounted on the reactor vessel. A slide is movable along and guided by the horizontal guide rail and a rotatably and vertically movable gripper is attached to the slide where the parts surrounding the gripper are provided with a vertical slot. The gripper can comprise a rotatable post tiltable around a horizontal axis, a vertical slide disposed on the post and vertically movable and a material pick-up device attched to the vertical slide. The vertical slide and the materials pick-up can be moved from below to above the level of the guide rail and vice versa.

10 Claims, 5 Drawing Figures

MANIPULATOR FOR A NUCLEAR REACTOR

BACKGROUND OF THE INVENTION

1. Field of the Invention

The present invention relates to a manipulator for a nuclear reactor which can be moved horizontally in the upper region of the reactor case and which is provided with a horizontally movable slide, which in turn supports a rotatable, vertically movable gripper.

2. Brief Description of the Background of the Invention Including Prior Art

Manipulators for handling materials in nuclear reactors of various kinds are known. However, the range of operation of conventional manipulators is in general limited to the interior of the nuclear reactor.

SUMMARY OF THE INVENTION

1. Purposes of the Invention

It is an object of the present invention to provide a manipulator for a nuclear reactor, which not only performs various operations within the spacially limited reactor such as demounting of reactor parts, repositioning, lowering and raising, or moving and operating various tools, but which is also capable of moving parts into the reactor or respectively out of the reactor.

It is another object of the present invention to provide a manipulator, which can perform even in confined quarters above the nuclear reactor the various kinds of operation required.

It is a further object of the present invention to provide a manipulator for a nuclear reactor where the pick-up device for the materials can be slid along an guide post from below to above the level of the mounting of the manipulator to the reactor case.

These and other objects and advantages of the present invention will become evident from the description which follows.

2. Brief Description of the Invention

The present invention provides a manipulator for a nuclear reactor disposed about the upper region of the reator case, which comprises a horizontal guide rail disposed in the free space in the upper region of the reactor, a slide movable along and guided by the horizontal guide rail, a rotatably and vertically movable gripper attached to the slide where the parts surrounding the gripper are provided with a vertical slot.

Preferably, a slewing track ring is provided for supporting the horizontal guide rail. The guide rail can be disposed at an expanded partial section of the slewing track ring. The horizontal guide rail can define a sector with respect to the slewing track ring where the minor arc angle of the sector is from about 90° to 120°.

The gripper can comprise a rotatable post tiltable around a horizontal axis, a vertical slide disposed on the post and vertically movable, and a material pick-up device attached to the vertical slide. The vertical slide and the material pick-up can be moved from below to above the level of the guide rail and vice versa. A rocker bearing can be provided for tilting the post. The rocker bearing can comprise a first annular plate having a multi-edged recess and being connected to the post, and a second annular plate attached to the slide and having an outer shape adapted to engage the multi-edged recess of the first annular plate.

There is also provided a method for manipulating materials in a nuclear reactor, which comprises disposing a ring mount near the upper end of a nuclear reactor, rotating a horizontal guide rail attached to the ring mount, moving a slide along the horizontal guide rail, rotating a support post attached to the slide relative to the slide around a vertical axis, sliding a vertical slide along the support post, and picking up material with a material pick-up device attached to the vertical slide.

Preferably, the vertical slide and the material pick-up are movable from below to above the level of the guide rail and vice versa. The horizontal guide rail can form a sector with the ring mount resulting in a minor arc angle of from about 90° to 120°. The support part can be rocked relative to the slide.

Thus the manipulator of the present invention is provided with a vertical slot in the parts surrounding the gripper. In order to provide a good view into the reactor or to transport even bulky parts into the reactor or respectively out of the reactor, the horizontal slide surrounding the gripper is attached to an enlarged or broadened partial section of a slewing track ring.

A further feature of the invention comprises that the gripper is composed of a rotary, vertically movable and tiltable post and of a vertically movable slide attached to the post and having attached a material pick-up device. Such a construction allows to work particularly deep into the reactor and at the same time is particularly well adapted to the narrow space situation above the reactor.

A further advanced feature of the invention comprises a rocker bearing comprising two annular plates, one of the plates having a multi-edged recess into which the outer forms of the other multi-edged plate can be fitted. Upon collision of the gripper with a part inside or outside of the reactor, the gripper with rotary axis in the rocker bearing tilts out of its vertical position such that the off-switch not shown in the drawing is turned off within the rocker bearing and the motion of the manipulator ceases and thereby a destruction of parts of any kind is prevented.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which is shown one of the various possible embodiments of the present invention.

DESCRIPTION OF INVENTION AND PREFERRED EMBODIMENTS

Figure 1:
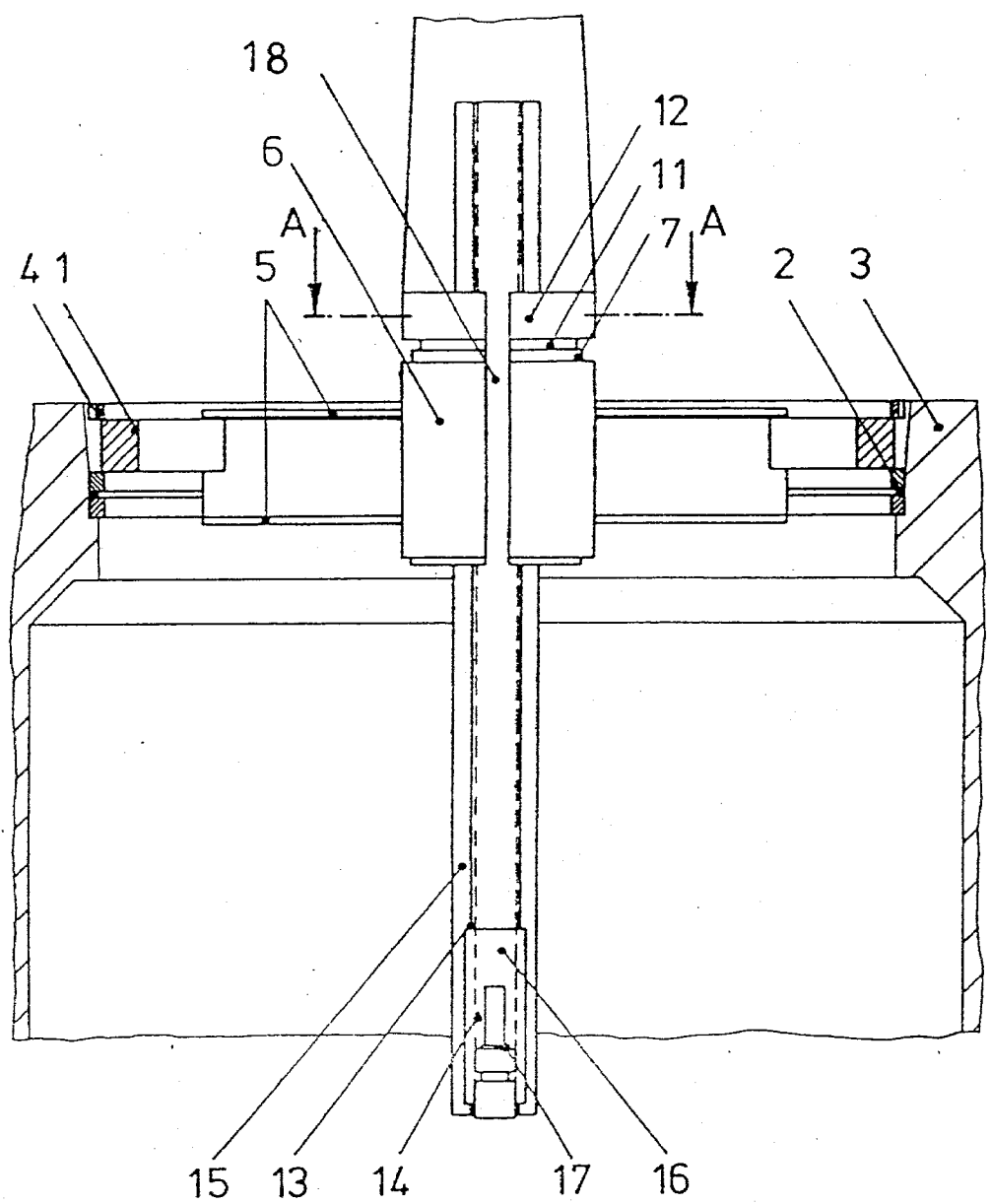
FIG. 1 is a view of a partially sectioned manipulator and of a section of a reactor upper part.
Figure 2:
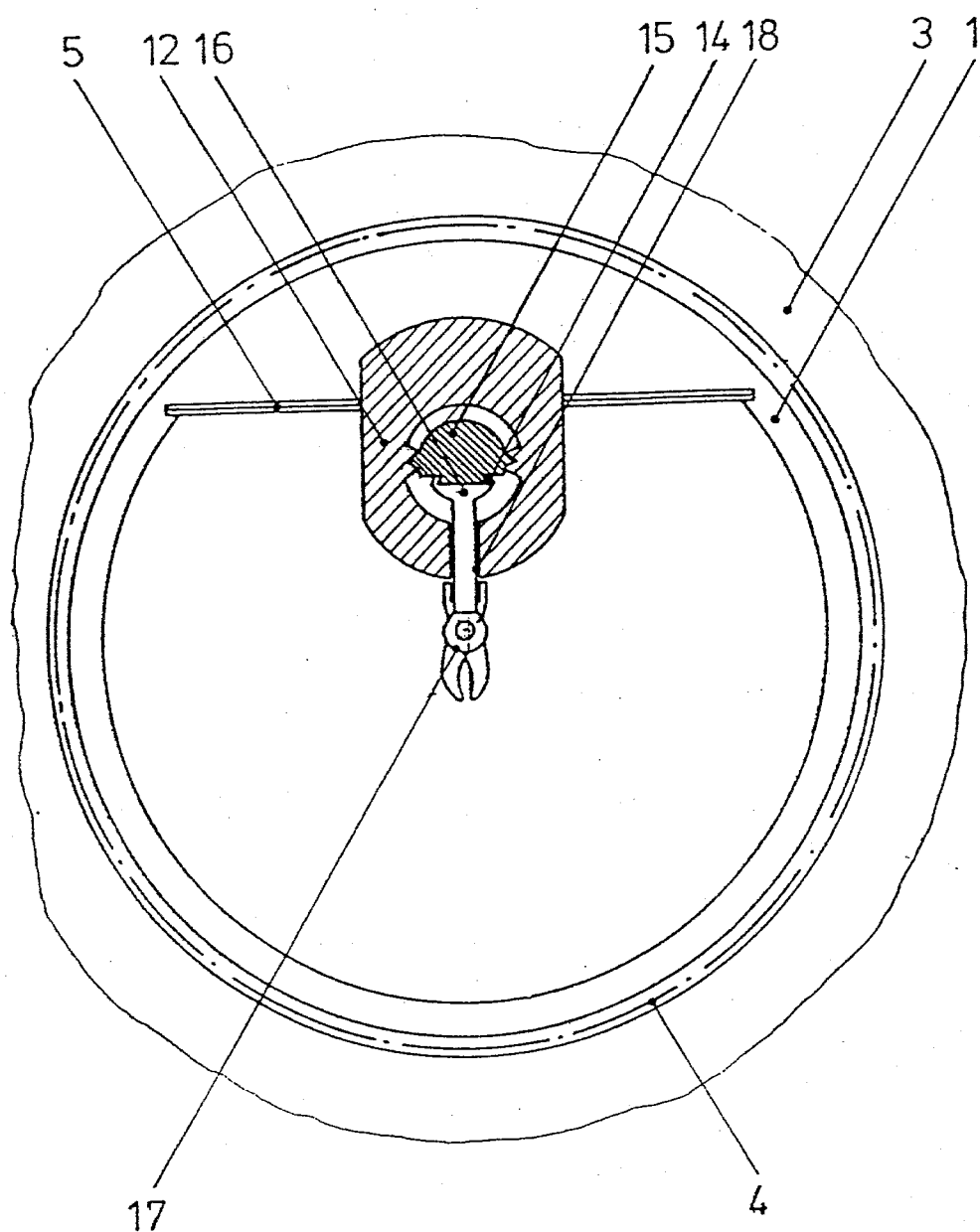
FIG. 2 is a sectional view along section line A—A of FIG. 1.
Figure 3:
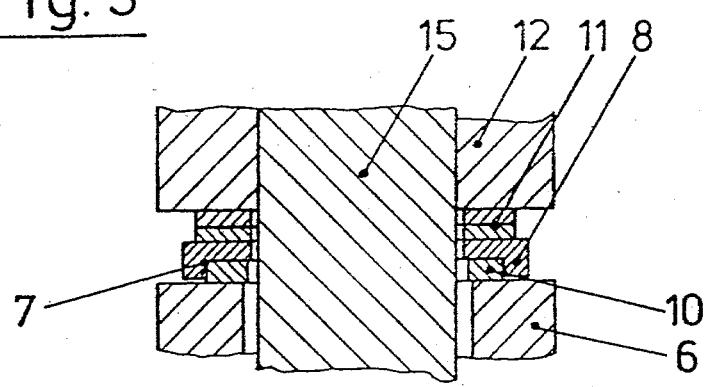
FIG. 3 is a sectional view of a rocker bearing in regular position.
Figure 4:
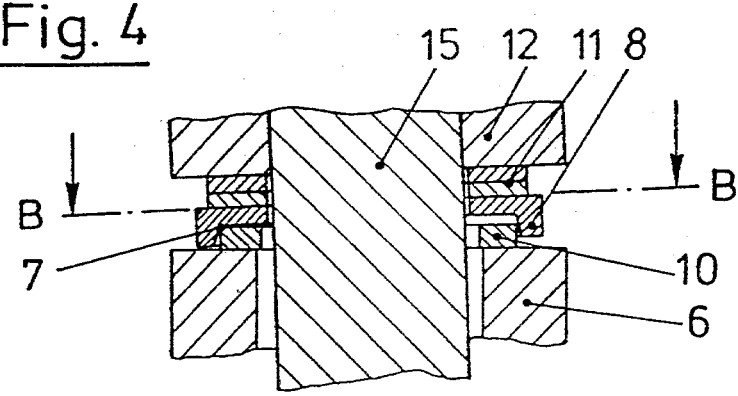
FIG. 4 is a sectional view of a rocker bearing in a tilted position.
Figure 5:
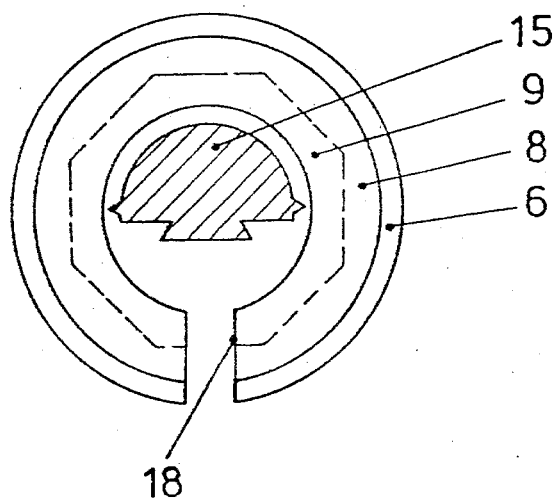
FIG. 5 shows a sectional view along section line B—B of FIG. 4.

In accordance with the present invention there is provided a manipulator for a nuclear reactor which is provided with a horizontally movable slide in the reactor case, which supports a rotatable and vertically movable gripper, where the parts surrounding the gripper 13 are provided with a vertical slot. The horizontal slide 6 is disposed at an enlarged partial section of a slewing track ring 1 and surrounds the gripper 13. The gripper comprises a rotatable, vertically movable and tiltable post 15 and a slide movable vertically along the post 15 having a material pick-up device 17. The rocker bearing 7 comprises two annular plates, of which one plate 8 is provided with a multi-edged recess 9 into which the outer shape of the other multi-edged plate 10 can be fitted.

The slewing track ring 1 is rotatably supported around the longitudinal axis of a reactor case 3 by a bearing 2 and can be moved via a toothing by way of drive means not shown in detail. Guide rails 5 are provided at an enlarged section of the slewing track ring, where a horizontally shiftable slide 6 is supported. Preferably, the horizontal guide rails 5 define a sector with respect to the slewing track ring where the minor arc angle of the sector is from about 90° to 120°. A rocker bearing 7 is disposed on the slide 6 which comprises two annular plates, of which one plate 8 is provided with a multi-edged recess 9 into which recess can be fitted the other multi-edged plate 10. A friction bearing 11 is disposed on the rocker bearing, one half of the friction bearing being rotatably connected to the support part 12 wherein the vertically movable gripper 13 is guided.

A vertical slide 16 with a material pick-up device 17 is disposed at a post 15 via a dovetail guide 14 providing vertical shiftability. A slot 18 for the passage of the vertical slide 16 is provided to the slide 6, at which the gripper 13 is rotatably, vertically shiftably and tiltably disposed, the support part 12, where the gripper 13 is disposed rigid to twisting and rotation, but vertically shiftable, the rocker bearing 7 and the friction bearing 11. The post 15 and the slide 16 in each case are by themselves or conjointly movable in vertical direction via ropes or rollers attached to the support part 12, which for reasons of simplification of the drawing for easier recognition are not shown here.

It will be understood that each of the elements described above, or two or more together, may also find a useful application in other types of system configurations and materials handling procedures differing from the types described above.

While the invention has been illustrated and described as embodied in a manipulator for a nuclear reactor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention:

What is claimed as new and desired to be protected by Letters Patent is set forth in the appended claims:

1. Manipulator for a nuclear reactor disposed about the upper region of the reactor case comprising
   a horizontal guide rail disposed in the free space in the upper region of the reactor;
   a slide movable along and guided by the horizontal guide rail;
   a rotatably and vertically movable gripper attached to the slide where parts surrounding the gripper are provided with a vertical slot;
   a rotatable post tiltable around a horizontal axis;
   a vertical slide disposed on the post and vertically movable;
   a material pick-up device attached to the vertical slide;
   a rocker bearing for tilting the post which comprises a first annular plate having a multi-edged recess and connected to the post; and
   a second annular plate attached to the slide and having an outer shape adapted to engage the multi-edged recess of the first annular plate.

2. The manipulator for a nuclear reactor according to claim 1 further comprising a slewing track ring supporting the horizontal guide rail.

3. The manipulator for a nuclear reactor according to claim 2 wherein the guide rail is disposed at an expanded partial section of the slewing track ring.

4. The manipulator for a nuclear reactor according to claim 2 wherein the horizontal guide rail defines a sector in the slewing track ring where the minor arc angle of the sector is from about 90° to 120°.

5. The manipulator for a nuclear reactor according to claim 1 where the vertical slide and the material pick-up device can be moved from below to above the level of the guide rail and vice versa.

6. A method for manipulating materials in a nuclear reactor comprising
   disposing a ring mount near the upper end of a nuclear reactor;
   rotating a horizontal guide rail attached to the ring mount;
   moving a slide along the horizontal guide rail;
   rotating a support post attached to a support part disposed on the slide relative to the slide around a vertical axis;
   sliding a vertical slide along the support post;
   picking up material with a material pick-up device attached to the vertical slide;
   tilting the support post around a horizontal axis with a rocker bearing which comprises a first annular plate having a multi-edged recess and connected to the post; and
   a second annular plate attached to the slide and having an outer shape adapted to engage the multi-edged recess of the first annular plate.

7. The method for manipulating materials according to claim 6 wherein the vertical slide and the material pick-up move from below to above the level of the guide rail and vice versa.

8. The method for manipulating materials according to claim 6 wherein the horizontal guide rail forms a sector with the ring mount having a minor arc angle of from about 90° to 120°.

9. The method for manipulating materials according to claim 6 further comprising rocking the support part relative to the slide.

10. The method for manipulating materials according to claim 6 further comprising controllably moving the post relative to the slide in a vertical direction.

* * * * *